(12) United States Patent
Inaba et al.

(10) Patent No.: US 6,227,500 B1
(45) Date of Patent: May 8, 2001

(54) METER MOUNTING STRUCTURE AND METER MOUNTING METHOD

(75) Inventors: Shigemitsu Inaba; Kazuhiro Morishita, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/281,070

(22) Filed: Mar. 9, 1999

(30) Foreign Application Priority Data

Mar. 9, 1998 (JP) .................................................. 10-056998

(51) Int. Cl.⁷ ........................................................ G12B 9/00
(52) U.S. Cl. .......................... 248/27.1; 248/27.3; 439/534
(58) Field of Search ................... 248/27.1, 27.3; 361/347; 439/34, 534; 296/70, 72; 180/90; 174/72 A

(56) References Cited

U.S. PATENT DOCUMENTS 5,021,003 * 6/1991 Ohtaka et al. ........................ 439/357
5,376,016 * 12/1994 Inaba et al. ........................... 439/364
5,589,715 * 12/1996 Nishitani et al. .................... 307/10.1
5,615,080 * 3/1997 Nishitani et al. .................... 361/664
5,627,409 * 5/1997 Nishitani ............................. 307/10.1
5,709,358 * 1/1998 Kubota ................................ 248/27.1
5,873,749 * 2/1999 Takiguchi et al. ................... 439/534
5,884,875 * 3/1999 Hanada et al. ...................... 248/27.1
6,048,020 * 4/2000 Gronowicz et al. .................. 296/70

* cited by examiner

*Primary Examiner*—Anita M. King
*Assistant Examiner*—N. Morrison
(74) *Attorney, Agent, or Firm*—Sughrue, Mion, Zinn, Macpeak & Seas, PLLC

(57) ABSTRACT

A meter is mounted to an instrument panel. The meter has an engaging portion in the form of a projection-like rotation shaft and projections located on the side walls of the meter. The instrument panel has a support groove and guide grooves. The meter is inserted into the instrument panel so that the projection-like rotation portion engages with the support groove of the panel. The meter is rotated about the projection-like rotation portion while the projections on the side wall of the meter engage with the guide grooves of the instrument panel.

3 Claims, 8 Drawing Sheets

METER MOUNTING STRUCTURE AND METER MOUNTING METHOD

BACKGROUND OF THE INVENTION

1. Field of the Invention

The present invention relates to a meter mounting structure and a meter mounting method, in which a meter is mounted into an instrument panel of an automobile.

The present application is based on Japanese Patent Application No. Hei. 10-56998, which is incorporated herein by reference.

2. Description of Related Art

A meter for an automobile is mounted to an instrument panel. As shown in FIG. 7, a meter 51 comprising a connector fitting portion 53 is pushed into an instrument panel 52 having a connector 54 from the front side to the inner side in the horizontal direction indicated by an arrow G in FIG. 7.

As a result of the pushing operation in the direction of the arrow G, as shown in FIG. 8, the connector fitting portion 53 of the meter 51 is fitted to the connector 54 of the instrument panel 52.

The above-mentioned meter mounting structure has the following problem. The meter 51 is held by a hand, and then pushed into the instrument panel 52 in a substantially horizontal manner, thereby fitting the connector fitting portion 53 to the connector 54. Therefore, it is difficult to correctly position the connector fitting portion 53 with respect to the connector 54, and the force required for fitting the connector fitting portion 53 to the connector 54 directly acts on the worker. Accordingly, there is a problem in that the assembly of the meter mounting structure is low in workability.

SUMMARY OF THE INVENTION

In order to eliminate the above-described problems, it is an object of the present invention to provide a meter mounting structure and a meter mounting method, in which positioning of a connector can be surely conducted, a meter can be easily inserted, and the assembly of the meter mounting structure can be improved in workability.

To achieve the above object, according to the first aspect of the present invention, there is provided a meter mounting structure which comprises a meter having a connector fitting portion, an instrument panel, into which the meter is inserted and mounted, having a connector for fitting to the connector fitting portion, a first engaging mechanism located at an end portion of the meter, and a second engaging mechanism disposed inside the instrument panel, wherein the meter is inserted into the instrument panel so as to bring the first engaging mechanism into engagement with the second engaging mechanism, and wherein the meter is rotated about a portion that the first engaging mechanism and the second engaging mechanism are to be engaged, so that the connector fitting portion and connector are fitted to each other.

Further, according to the second aspect of the invention, there is provided a meter mounting method. First, a meter having a first engaging mechanism, and an instrument panel having a second engaging mechanism are provided. Next, the meter is inserted into the instrument panel so as to bring the first engaging mechanism into engagement with the second engaging mechanism. Afterwards, the meter is pushed toward the instrument panel to rotate about a portion that the first engaging mechanism and the second engaging mechanism are to be engaged, so that the meter is completely mounted to the instrument panel.

In the above meter mounting structure and method, in accordance with the principle of the lever, the force which must be applied to the meter can be reduced as compared with the related art. As a result, assembling workability can be improved.

According to the third aspect of the present invention, preferably, the first engaging mechanism includes a projection-like rotation shaft which is formed on a corner portion of the meter adjacent to a back face of the meter, and the second engaging mechanism includes a support groove for receiving the rotation shaft. Alternatively, the second engaging mechanism may include a projection-like rotation shaft which is located at an inner side of the instrument panel, and the first engaging mechanism may include a support groove for receiving the rotation shaft. According to the third aspect of the present invention, the rotation shaft can be easily inserted into the support groove.

According to the fourth aspect of the present invention, preferably, the meter is inserted into the instrument panel while the meter is guided by guiding mechanisms. More specifically, projections respectively formed on side surfaces of the meter, and guide grooves respectively formed in inner side faces of the instrument panel, are provided. When the meter is inserted into the instrument panel, the projections are respectively guided by the guide grooves, and therefore, the insertion and positioning can be easily conducted.

DETAILED DESCRIPTION OF THE PREFERRED EMBODIMENT

An embodiment of the present invention will be described below with reference to FIGS. 1 to 6.

Figure 1:
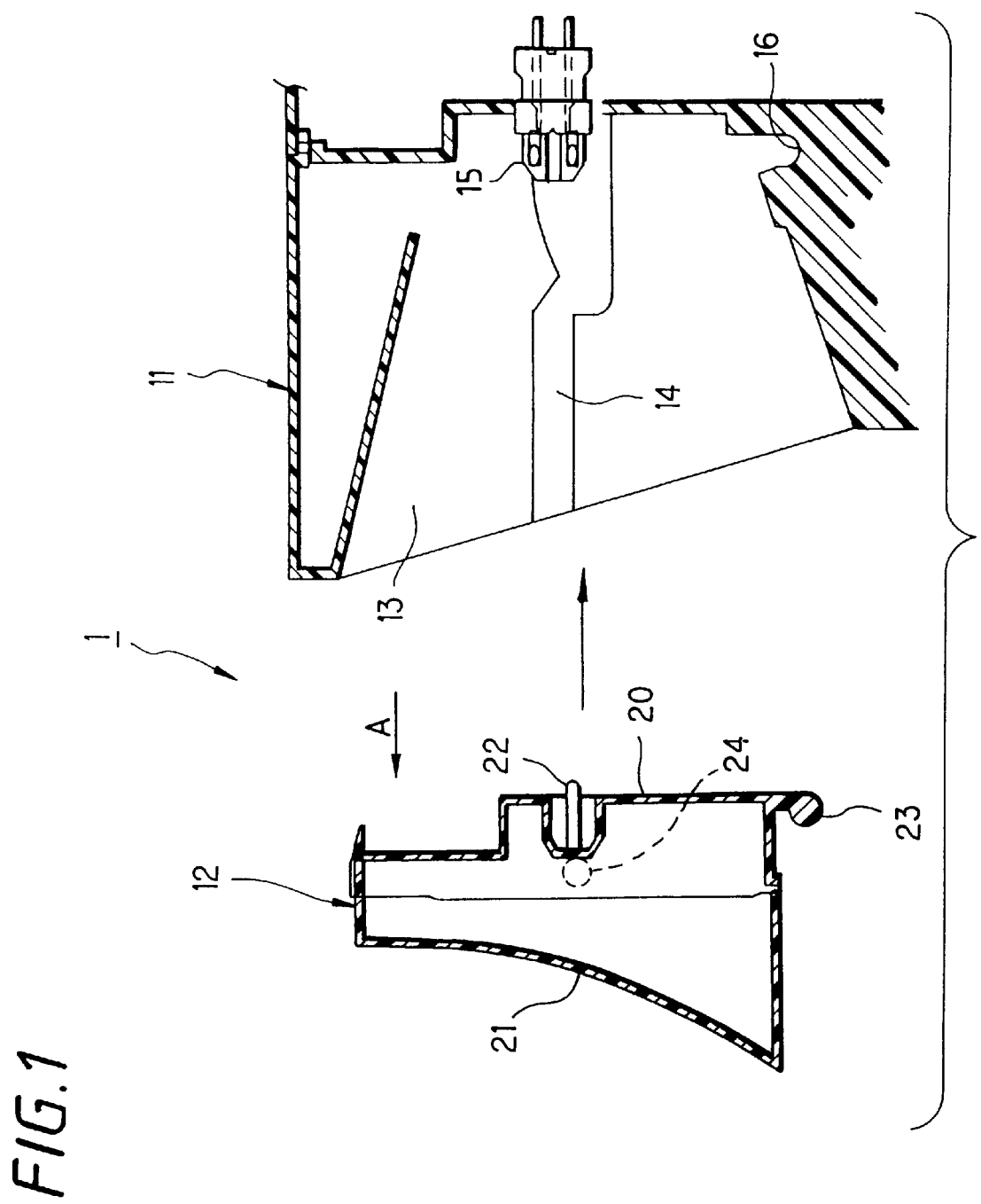
FIG. 1 is a sectional view showing a meter mounting structure according to the present invention in a state before the assembly.

As shown in FIG. 1, the meter mounting structure 1 of the embodiment is configured by an instrument panel 11 and a meter 12.

Guide grooves 14 having a suitable width is formed in an appropriate position. In this embodiment, the guide grooves 14 are respectively formed in substantially center portions of the inner side faces 13 of the instrument panel 11. The guide grooves 14 extend in a substantially horizontal direction from the front end thereof to the halfway portion thereof, and are downwardly inclined from the halfway portion toward the inner side of the instrument panel so as to be directed to a support groove 16 (described later). Then the guide grooves 14 extend slightly upward in an arcuate shape.

Connectors 15 are formed in a substantially center portion of the inner rear face of the instrument panel 11. However, it is not required that the connectors 15 be formed in the center area of the inner rear face of the instrument panel 11.

The support groove 16 serves as a second engaging mechanism. Incidentally, rotation shafts 23 (described later)

disposed on the meter can be engaged with the support groove 16. The support groove 16 is formed in the inner bottom face of the instrument panel 11 at the inner side.

The support groove 16 extends along the longitudinal direction of the instrument panel 11.

The meter 12 has a meter case 20 which is made of a resin and into which various instruments and the like are to be disposed, and a front glass 21 attached to the meter case 20.

In the center portion of the meter case 20, plural connector fitting portions 22 which can be respectively fitted to the connectors 15 of the instrument panel 11 are formed along the longitudinal direction.

Rotation shafts 23 serve as a first engaging mechanism, and outwardly project from the meter case 20. The rotation shafts 23 are disposed in an edge portion (corner portion) of the bottom face of the meter case 20. The rotation shafts 23 are arranged intermittently (see FIG. 2) along the longitudinal direction of the meter case 20, and can be inserted into the support groove 16 of the instrument panel 11.

Figure 2:
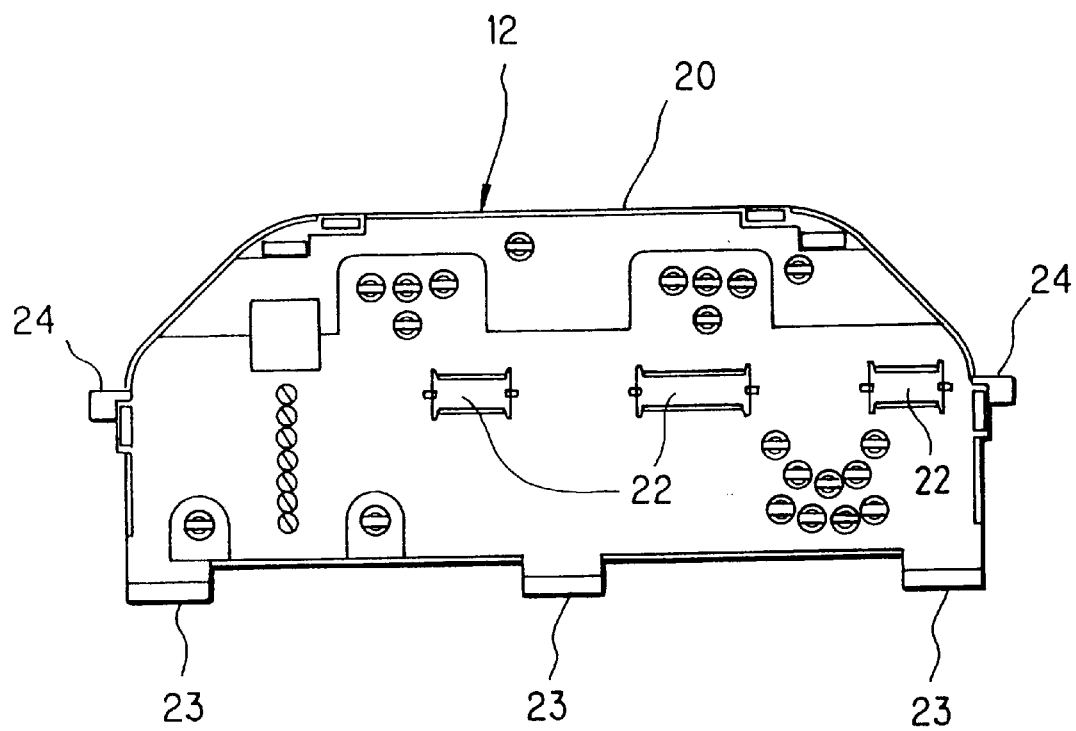
FIG. 2 is a view in the direction indicated by an arrow A of FIG. 1.

As shown in FIG. 2, projections 24 are respectively formed on the outer side faces of the meter case 20 at the substantially center position thereof.

The projections 24 can be inserted into the guide grooves 14 of the instrument panel 11, respectively. The guide grooves 14 and the projections 24 are associated with each other as guiding mechanisms for guiding insertion of the meter 12.

Hereinafter, the operation of mounting the meter 12 to the instrument panel 11 will now be described in detail with reference to FIGS. 3 to 6.

Figure 3:
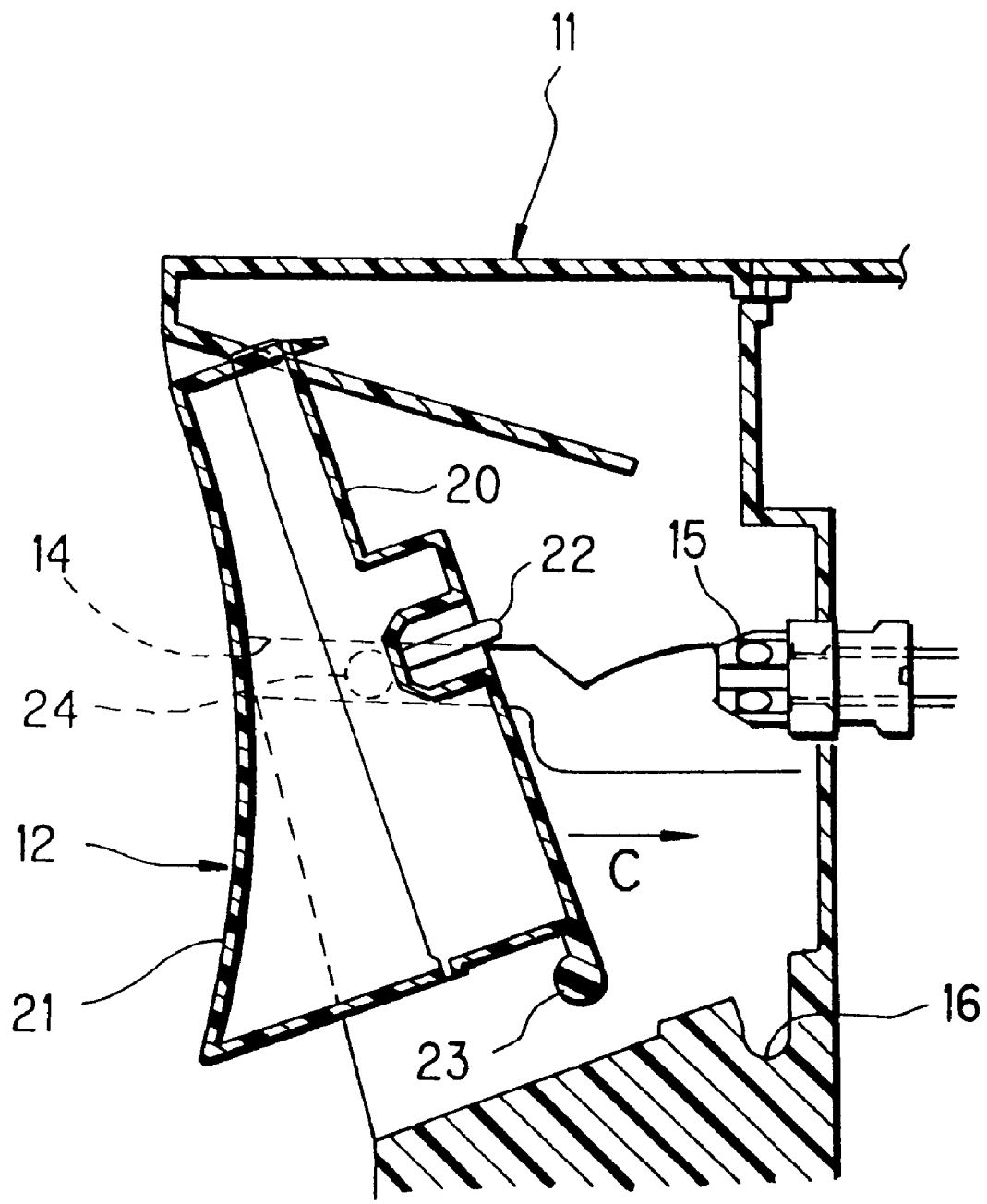
FIGS. 3 to 6 show an assembly procedure of the meter mounting structure according to the present invention.

When the meter 12 is to be mounted to the instrument panel 11, the projections 24 on both the sides of the meter 12 are first inserted (in the direction of the arrow C) into the guide grooves 14 of the instrument panel 11, respectively, as shown in FIG. 3.

Then, the meter 12 is pushed. At this time, the meter 12 is pushed in a posture in which the portion on the side of the rotation shafts 23 is projected. As a result, the meter 12 is inserted under a state in which the center axis of the meter 12 coincides with that of the instrument panel 11.

Figure 4:
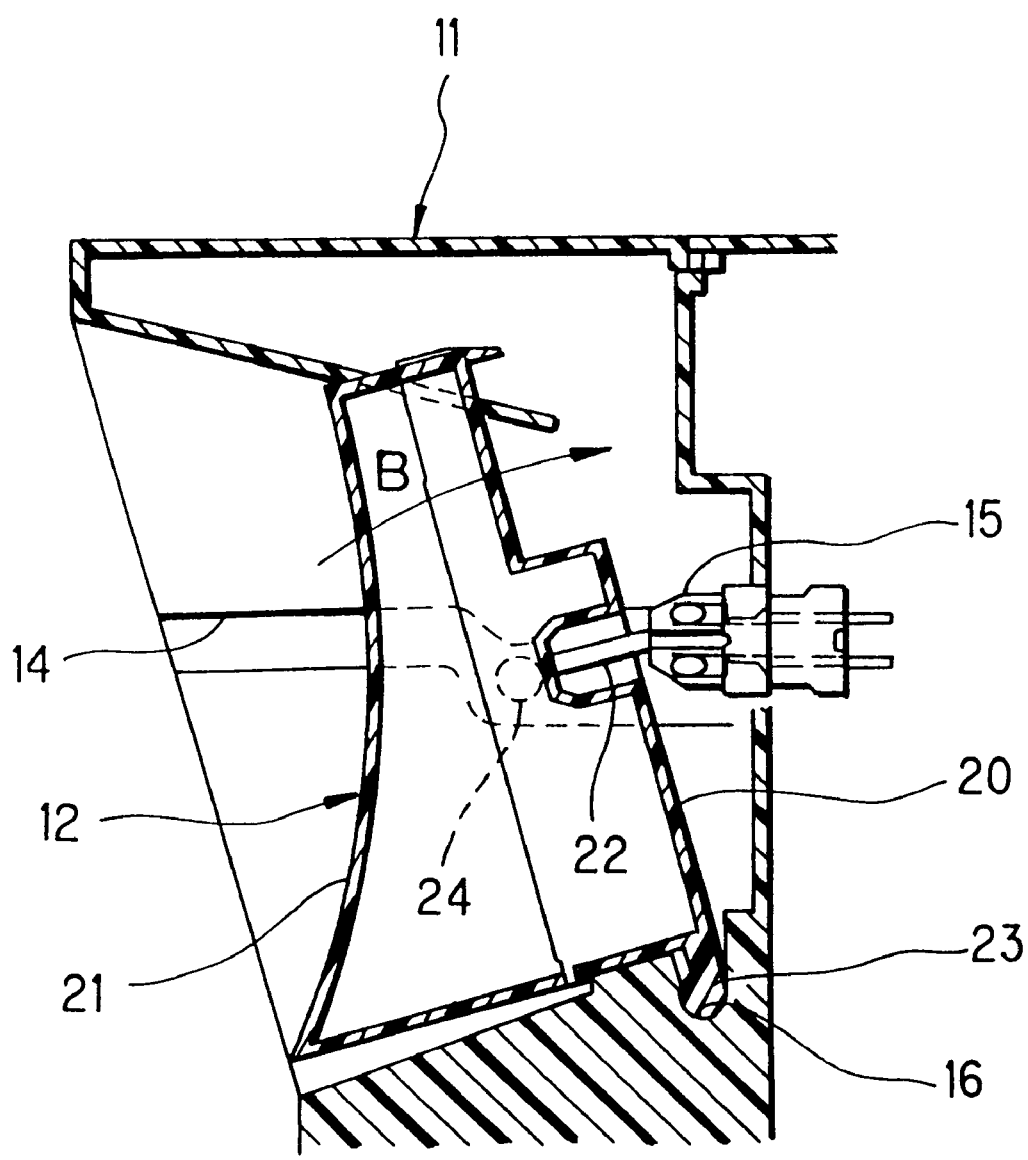

Next, as shown in FIG. 4, the rotation shafts 23 of the meter 12 are inserted into the support groove 16 of the instrument panel 11, and the meter 12 is then rotated about the rotation shafts 23 in a clockwise direction (the direction of the arrow B) in FIG. 4. That is, the meter 12 can be rotationally moved while using the axial center of the rotation shafts 23 as the fulcrum, so that the projections 24 are respectively guided by the guide grooves 14.

Figure 5:
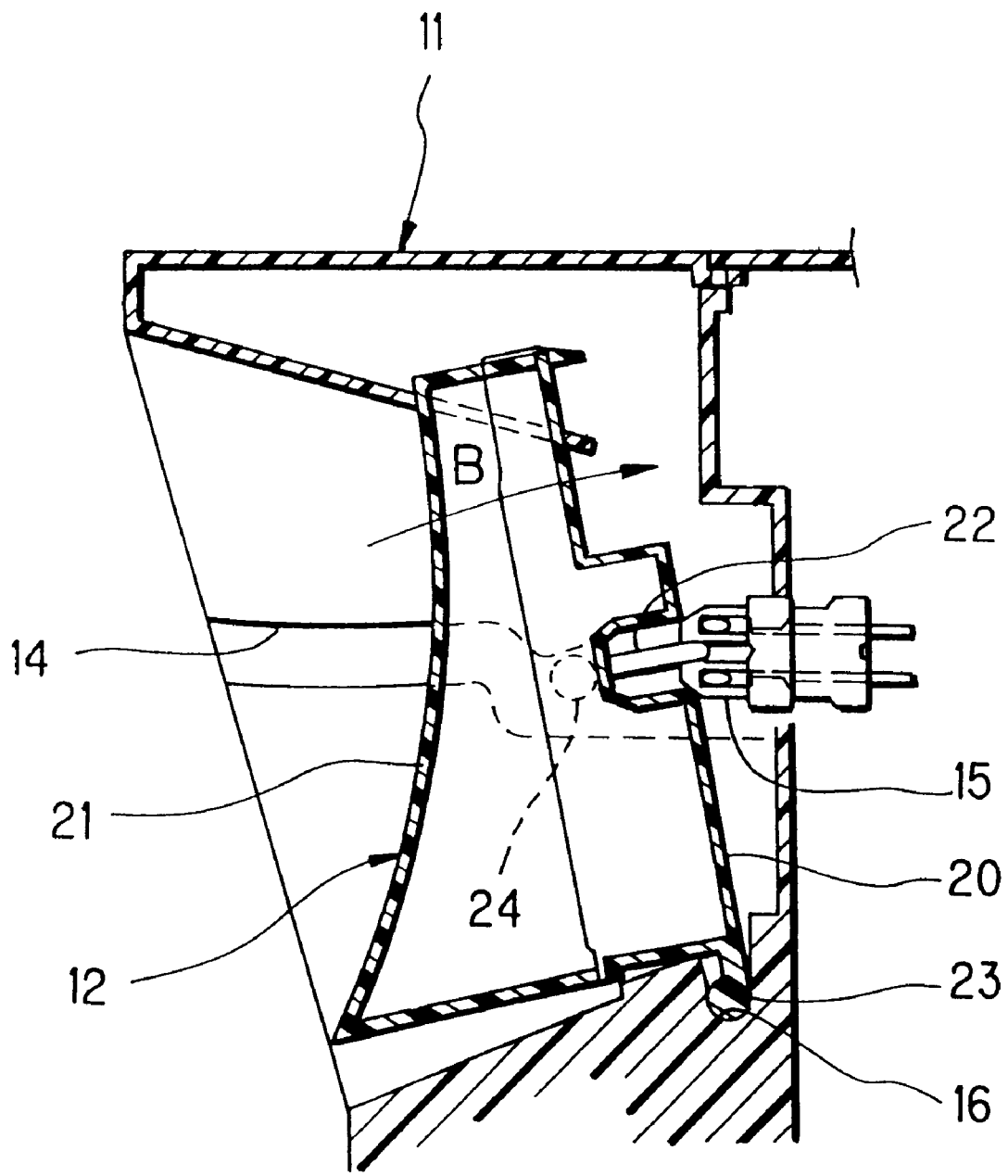

As a result of this rotational movement, as shown in FIG. 5, the connector fitting portions 22 of the meter 12 can be automatically directed to the connectors 15 of the instrument panel 11, respectively, and be fitted thereto by a final pushing operation.

Figure 6:
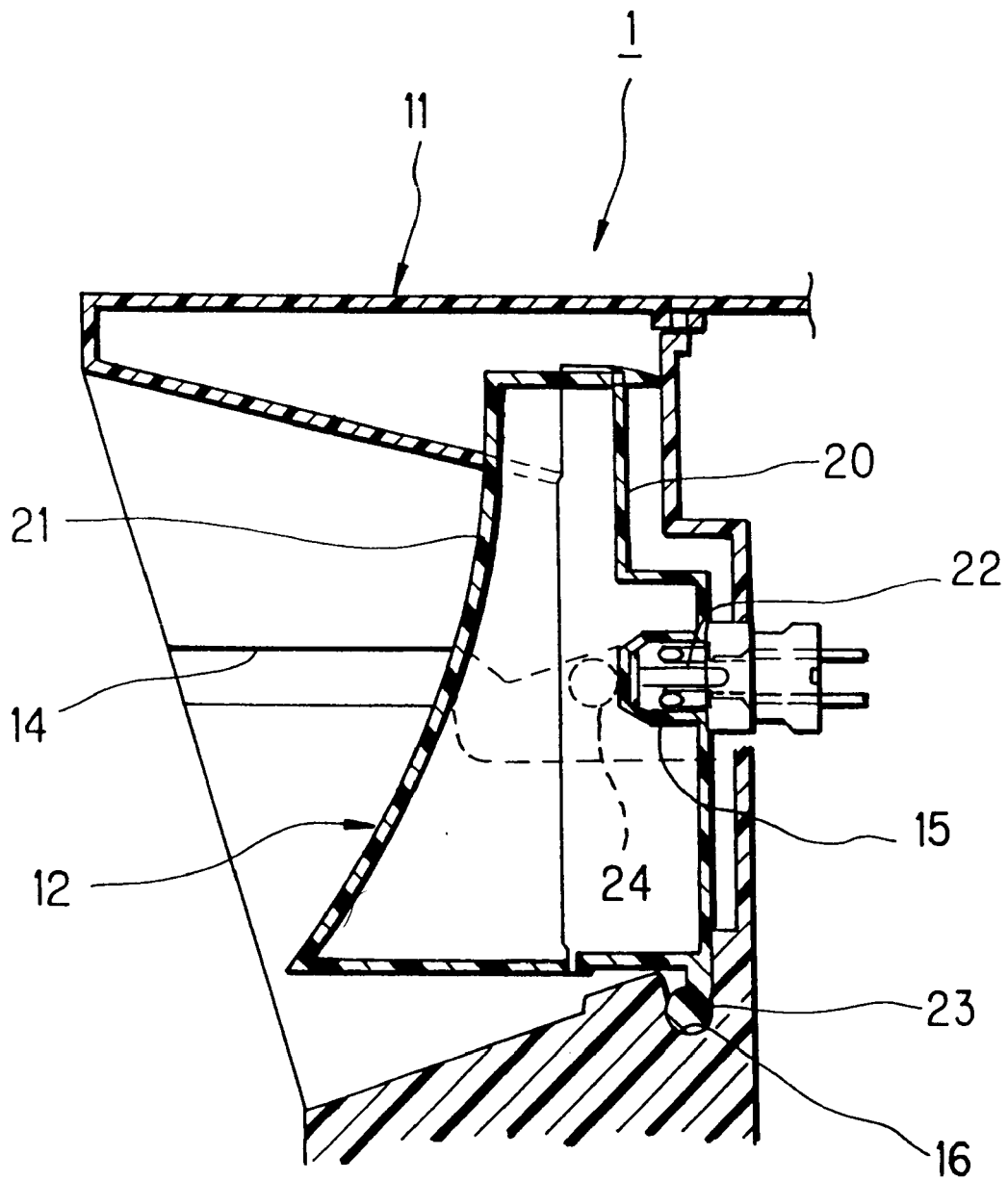
Figure 7:
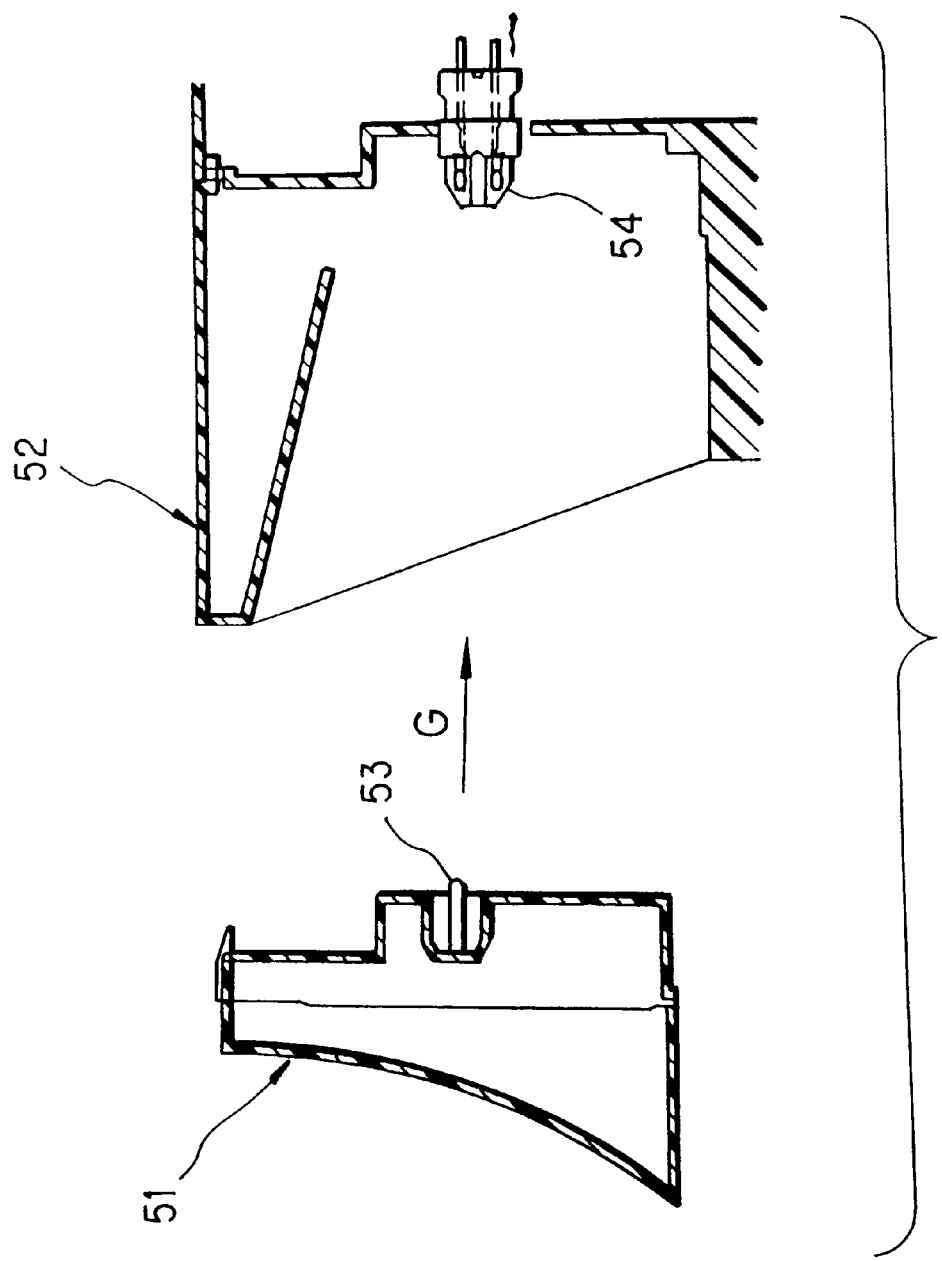
FIG. 7 is a sectional view showing the meter mounting structure of the related art in a state before the assembly.
Figure 8:
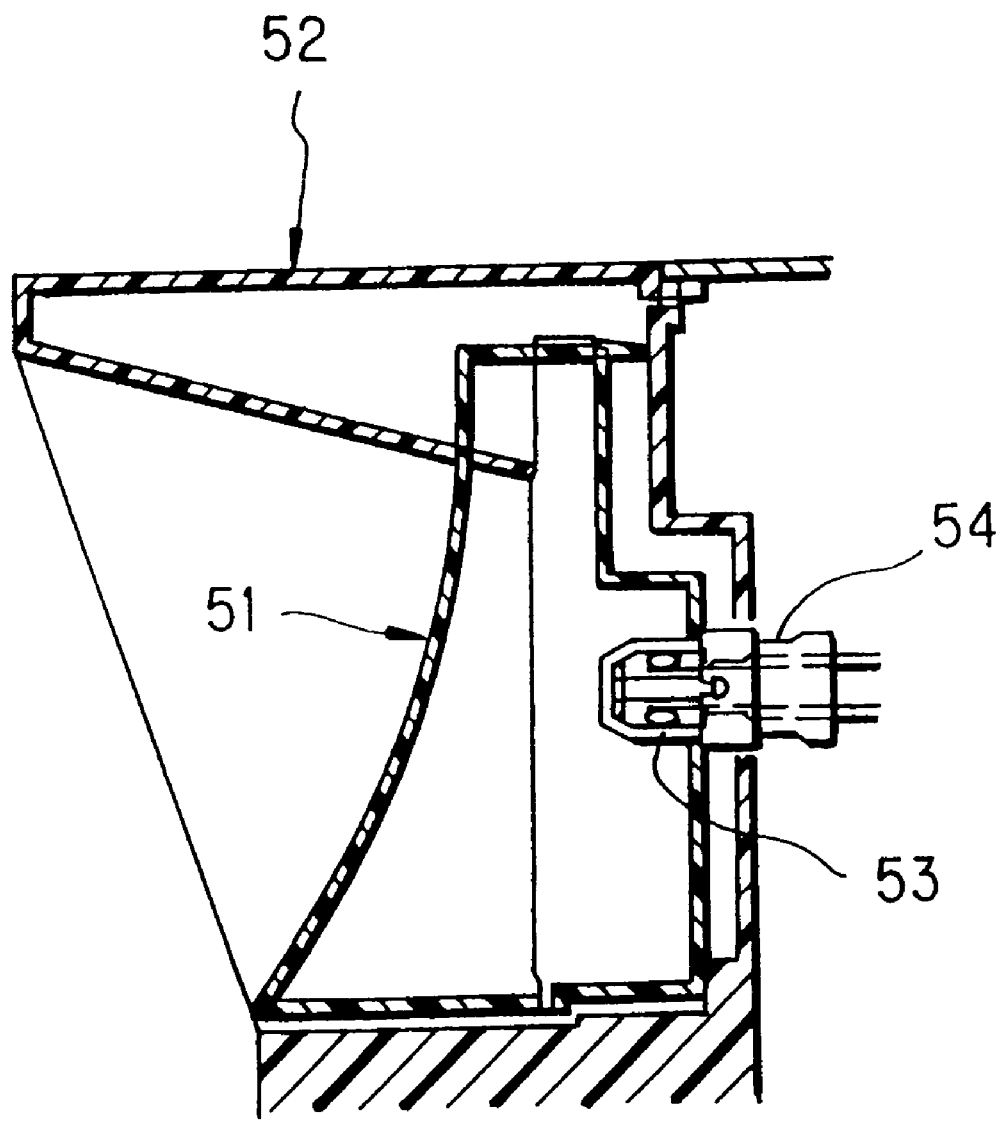
FIG. 8 shows the meter mounting structure of the related art in a state in which the meter is mounted into the instrument panel.

As shown in FIG. 6, the series of continuous operations finally causes the connector fitting portions 22 and the connectors 15 to be firmly coupled to each other, whereby the meter 12 is surely fixedly mounted to the instrument panel 11.

As described above, in the meter mounting structure 1 of the present invention, the rotation shafts 23 in the lower end portion of the meter 12 are inserted into the support groove 16 of the instrument panel 11, and the meter 12 is rotated about the axial center of the rotation shafts 23, whereby the connector fitting portions 22 of the meter 12 are fitted to the connectors 15 of the instrument panel 11. In accordance with the principle of the lever, therefore, the force which must be applied to the meter 12 can be reduced as compared with the related art. Accordingly, the assembly can be improved in workability.

In the embodiment, since the rotation shafts 23 of the meter 12 are disposed in the lower end portion of the meter 12, the rotation shafts 23 can be easily inserted into the support groove 16. As the guiding mechanism for insertion of the meter 12, furthermore, the guide grooves 14 are disposed in the instrument panel 11 and the projections 24 are disposed on the meter 12. Therefore, the insertion of the meter 12 can be easily conducted, and the workability can be improved.

The embodiment is configured so that the rotation shafts 23 in the lower end portion of the meter 12 are inserted into the support groove 16 of the instrument panel 11, and the meter 12 is rotated about the rotation shafts 23 in a clockwise direction. Alternatively, the mounting structure may be configured so that the rotation shafts 23 disposed in the upper end portion of the meter 12 are inserted into the support groove 16 formed in the inner upper face of the instrument panel 11 and at a position in the inner side, so as to hang the meter 12, and the meter 12 is then rotated about the rotation shafts 23 in a counterclockwise direction. In the alternative, it is a matter of course that the guide grooves 14 are configured into a shape in which the positional relationships in the vertical direction are inverted as compared with those in the embodiment described above.

When the meter 12 is once held in a hanging state and then rotated to be fixed as described above, the workability can be improved and the positioning before fixation of the meter can be easily conducted. In place of the support groove 16, a hanging support portion having an arcuate section shape may be formed as supporting mechanism which is to be formed in the instrument panel 11, and the rotation shafts 23 may be engaged with the hanging support portion.

In the embodiments, the rotation shafts 23 are disposed on the side of the meter, and the support groove 16 and the like are disposed on the side of the instrument panel. The engaging structure may be configured so that the projection/depression relationships are inverted. In the present invention, the rotation shafts 23 may be configured so as to have a continuous shaft-like shape or a pin-like shape.

In the present invention, the relationships between the guide grooves 14 and the projections 24 which cooperate to serve as the guiding mechanism may have a configuration in which the projections 24 are formed on the side of the instrument panel and the guide grooves on the side of the meter. Alternatively, the above-mentioned configurations may be combined with each other so that a guide groove and a projection are disposed on both the lateral sides of the meter, respectively.

As described above, in the meter mounting structure according to the present invention, the first engaging mechanism formed at an end portion of the meter is engaged with the second engaging mechanism of the instrument panel, and the meter is rotated about the axial center of the engaging mechanism, whereby the connector fitting portion of the meter is fitted to the connector of the instrument panel. In accordance with the principle of the lever, therefore, the force which must be applied to the meter can be reduced as compared with the related art. As a result, the assembling workability can be improved.

The engagement of the rotation shaft and the support groove enables the positioning of the meter to be easily conducted. Furthermore, the operation of mounting the meter can be realized by the series of the pushing operation and the rotating operation. Therefore, the assembling property can be remarkably improved.

In the present invention, when the rotation shaft is disposed in the lower end portion of the meter, the rotation shaft can be easily inserted into the support groove. When the guiding mechanism for insertion of the meter is disposed in the instrument panel and the meter, the insertion of the meter can be conducted by an operation which is continuous from the start to the end of the insertion. Therefore, the assembling work can be facilitated.

What is claimed is:

1. A meter mounting structure comprising:

a meter having a connector fitting portion;

an instrument panel, into which the meter is inserted and mounted, having a connector for fitting to the connector fitting portion;

a first engaging mechanism located at an end portion of the meter;

a second engaging mechanism disposed inside the instrument panel, wherein the meter is inserted into the instrument panel so as to bring the first engaging mechanism into engagement with the second engaging mechanism, wherein the meter is rotated about a portion such that the first engaging mechanism and the second engaging mechanism are to be engaged, so that the connector fitting portion and connector are fitted to each other; and guiding mechanisms, wherein the meter is inserted into the instrument panel while the meter is guided by the guiding mechanisms.

2. A meter mounting structure comprising:

a meter having a connector fitting portion;

an instrument panel, into which the meter is inserted and mounted, having a connector for fitting to the connector fitting portion;

a first engaging mechanism located at an end portion of the meter;

a second engaging mechanism disposed inside the instrument panel, wherein the meter is inserted into the instrument panel so as to bring the first engaging mechanism into engagement with the second engaging mechanism, wherein the meter is rotated about a portion such that the first engaging mechanism and the second engaging mechanism are to be engaged, so that the connector fitting portion and connector are fitted to each other;

projections respectively formed on side surfaces of the meter; and guide grooves in the form of channels respectively formed in inner side faces of the instrument panel, such that when the meter is inserted into the instrument panel, the projections are respectively guided by the guide grooves.

3. A meter mounting method, comprising steps of:

providing a meter having a first engaging mechanism, and an instrument panel having a second engaging mechanism;

inserting the meter into the instrument panel so as to bring the first engaging mechanism into engagement with the second engaging mechanism;

pushing the meter toward the instrument panel to rotate about a portion that the first engaging mechanism and the second engaging mechanism are to be engaged, so that the meter is completely mounted to the instrument panel; and guiding the meter into the instrument panel using a guiding mechanism disposed in the instrument panel and a guiding mechanism disposed in the meter wherein the first engaging mechanism is brought into engagement with the second engaging mechanism while the meter is guided by the guiding mechanism of the instrument panel and the guiding mechanism of the meter.

* * * * *